(12) United States Patent
Mao et al.

(10) Patent No.: US 9,751,200 B2
(45) Date of Patent: Sep. 5, 2017

(54) CORE DISASSEMBLING DEVICE

(71) Applicant: WALTOP INTERNATIONAL CORPORATION, Hsinchu (TW)

(72) Inventors: Chung-Fuu Mao, Hsinchu (TW); Hsin-Chiang Ho, Hsinchu (TW)

(73) Assignee: WALTOP INTERNATIONAL CORPORATION, Hsinchu (TW)

( * ) Notice: Subject to any disclaimer, the term of this patent is extended or adjusted under 35 U.S.C. 154(b) by 0 days.

(21) Appl. No.: 14/969,754

(22) Filed: Dec. 15, 2015

(65) Prior Publication Data
US 2017/0106511 A1    Apr. 20, 2017

(30) Foreign Application Priority Data
Oct. 16, 2015   (TW) ............................. 104216545 U

(51) Int. Cl.
*B25B 27/02*   (2006.01)
*G06F 3/044*   (2006.01)
*G06F 3/0354*  (2013.01)

(52) U.S. Cl.
CPC .......... *B25B 27/02* (2013.01); *G06F 3/03545* (2013.01); *G06F 3/044* (2013.01)

(58) Field of Classification Search
None
See application file for complete search history.

(56) References Cited

U.S. PATENT DOCUMENTS

| 5,244,090 A * | 9/1993 | Keith | A46B 17/04 15/142 |
| 7,543,718 B2 * | 6/2009 | Simon | A61J 7/0084 206/380 |
| 2016/0089139 A1 * | 3/2016 | Koman | A61B 17/0493 206/572 |

OTHER PUBLICATIONS

Microsoft Surface Pen Kit Apr. 2017 from https://mspoweruser.com/new-microsoft-surface-pen-with-pen-kit-now-available-for-pre-order/.*
Wacom Pen and Box from Mar. 2017 from https://www.sketcher-man.com/blog/?offset=1443530109251.*

* cited by examiner

*Primary Examiner* — Joseph J Hail
*Assistant Examiner* — Brian Keller
(74) *Attorney, Agent, or Firm* — Muncy, Geissler, Olds & Lowe, P.C.

(57) ABSTRACT

The invention relates to a core disassembling device. The core disassembling device comprises an opening-closing box housing and at least one holding hole deposited at one side of the opening-closing box housing. The opening-closing box housing comprises an upper housing and a bottom housing, and the holding hole comprises a first notch and a second notch. The first notch is deposited at one side of the upper housing and the second notch is deposited at one side of the bottom housing. The second notch is corresponded to the first notch. When the opening-closing box housing is closed, the first notch and the second notch constitute the holding hole for holding and fixing the core of the capacitance pen. Therefore, it is easy and convenient for a user to draw the core out the capacitance pen and to change a new core.

8 Claims, 5 Drawing Sheets

CORE DISASSEMBLING DEVICE

CROSS REFERENCE

This application claims priority from Taiwan Patent Application No. 104216545, filed Oct. 16, 2015, the content of which are hereby incorporated by reference in their entirety for all purposes.

BACKGROUND OF THE INVENTION

1. Field of the Invention

The present invention relates to a core disassembling device, and particularly relates to a core disassembling device using a holding hole to hold a core of the capacitance pen and to quickly draw the core out the capacitance pen.

2. Description of the Prior Art

Along with popularization of touch devices (such as touch panel, touch screen phone, tablet PC, etc.), capacitance pens have been frequently used to handwriting input (means input information by handwriting) to touch devices in daily life. In such situation, the core of the capacitance pen often collides with hard objects (such as ground, table, etc.) if users do not carry, move, use, and place the capacitance pen carefully. The collision results in deformation of the core of the capacitance pen. The deformation has a bad influence on signal output of the capacitance pen. It has a need of changing the core of the capacitance pen when the core of the capacitance pen is deformed. However, the core of the capacitance pen is fine and only a part of the core stretches out the housing of the capacitance pen. Therefore, the user only can use his or her fingertips to pinch the core and to draw the core out the housing of the capacitance pen when the user changes the core of the capacitance pen. This posture of application of force to pinch and draw the core is hard to draw the core out the housing of the capacitance pen, and it increases the difficulty in drawing the core out the housing of the capacitance pen. It also results in pain of the user's fingers. Besides, in the process of assembling the capacitance pen, the core is held very tightly in the housing of the capacitance pen for avoiding the core being loose in use. Therefore, the user needs much effort or force to draw the core out the housing of the capacitance pen by above-mentioned posture. However, some users (such as the child, the old, the woman, etc.) do not have enough power or force to draw the core out the housing of the capacitance pen with fingers. It is difficult to draw the core out the housing of the capacitance pen with fingers for these users. Therefore, it has a need of a core disassembling device which can help the user to hold the core of the capacitance pen for conveniently and easily drawing the core out the housing of the capacitance pen and changing the core.

SUMMARY OF THE INVENTION

In view of the foregoing, one object of the present invention is to provide a core disassembling device. The core disassembling device helps the user to hold the core of the capacitance pen with a posture easily holding and forcing the core of the capacitance pen. By the core disassembling device, the user can draw the core out the housing of the capacitance pen and change a new core quickly and conveniently without a need of much effort or force. Therefore, the user also can draw the core out the housing of the capacitance pen without the pain of the user's fingers caused by the bad forcing pose and much force.

According to one of the objects above, a core disassembling device is disclosed herein. The core disassembling device comprises an opening-closing box housing and at least one holding hole deposited at one side of the opening-closing box housing. The opening-closing box housing comprises an upper housing and a bottom housing. The upper housing is corresponded to the bottom housing. One side of the upper housing is connected with one side of the bottom housing for forming the opening-closing box housing. Each holding hole comprises a first notch and a second notch. The first notch is deposited at one side of the upper housing and the second notch is deposited at one side of the bottom housing. The first notch is corresponded to the second notch. When the opening-closing box housing is closed, the first notch and the second notch are integrated together to form the holding hole for holding and fixing a core of a capacitance pen to help a user to draw a core out the capacitance pen.

Therefore, the present invention provides a core disassembling device. The user can use the holding hole of the core disassembling device in place of the user's fingers to hold the core of the capacitance pen. When the user changes the core, the user can perform a force on the opening-closing box housing of the core disassembling device in place of the core. Therefore, the user can have a good posture of application of force to hold and draw the core. By this posture, the force (or effort) for drawing and changing the core can be decreased and it is easy and convenient for the user to change the core of the capacitance pen.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components. Although specific embodiments have been illustrated and described, it will be appreciated by those skilled in the art that various modifications may be made without departing from the scope of the present invention, which is intended to be limited solely by the appended claims.

Figure 1A:
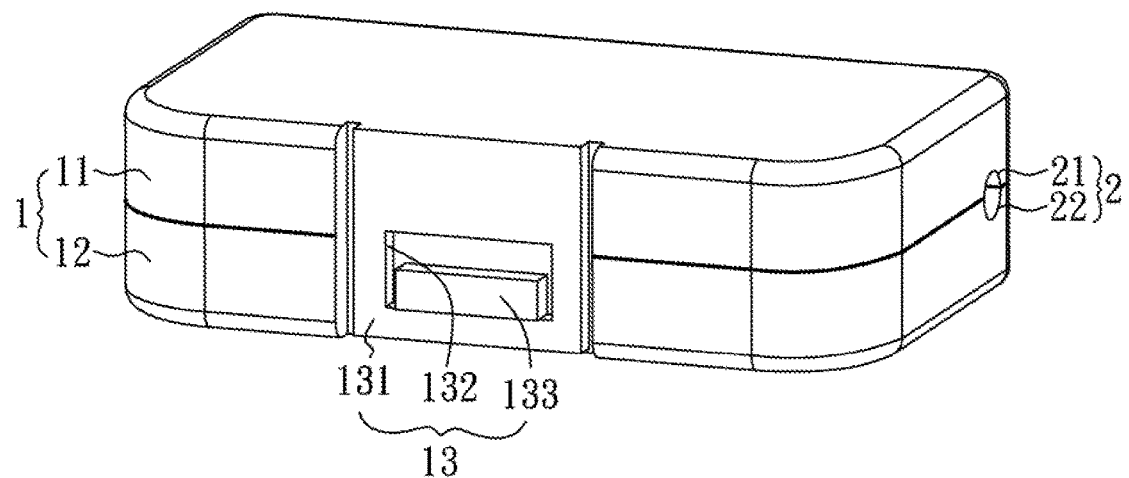
FIG. 1A to FIG. 1D are drawings in front view, in left view, in right view, and in back view of a core disassembling device in accordance with one embodiment of the present invention.
Figure 1B:
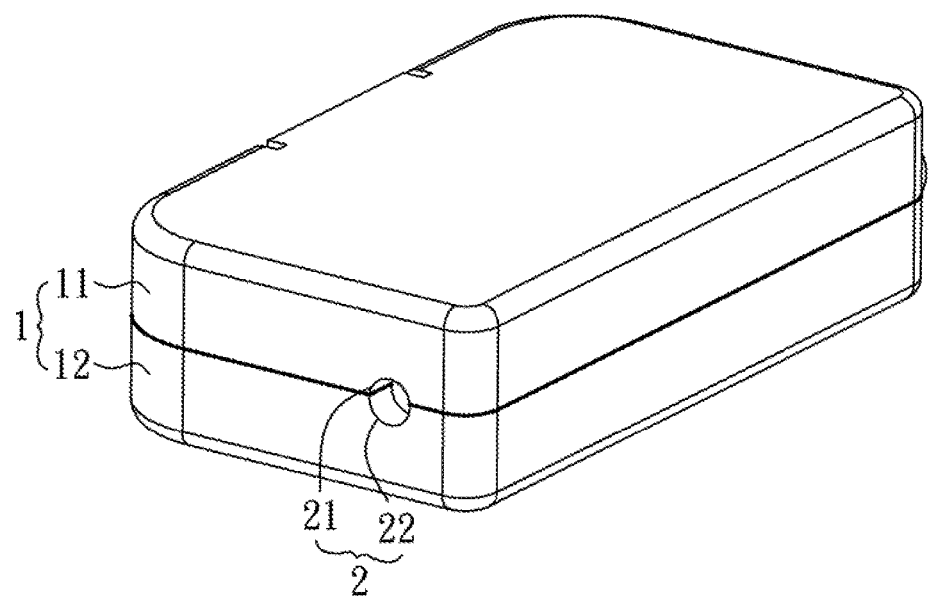
Figure 1C:
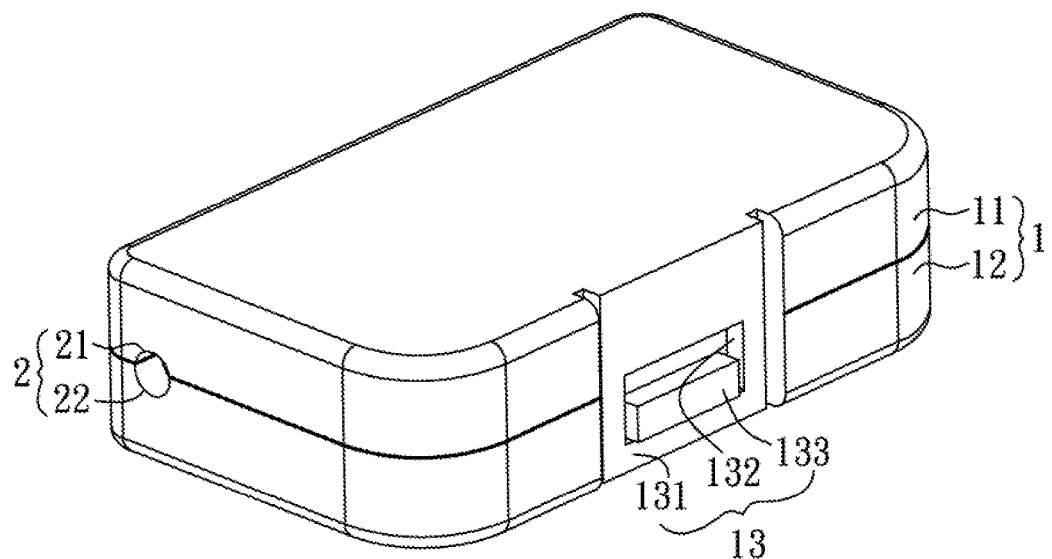
Figure 1D:
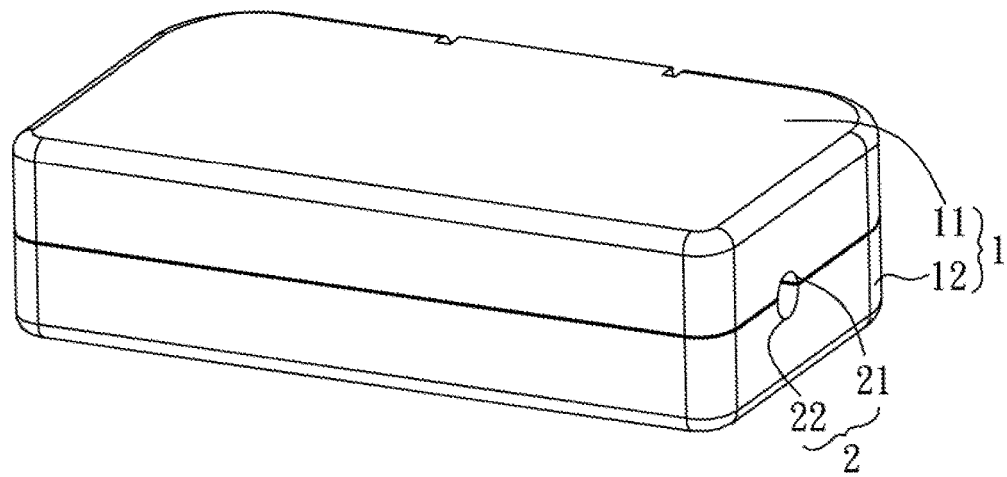
Figure 1E:
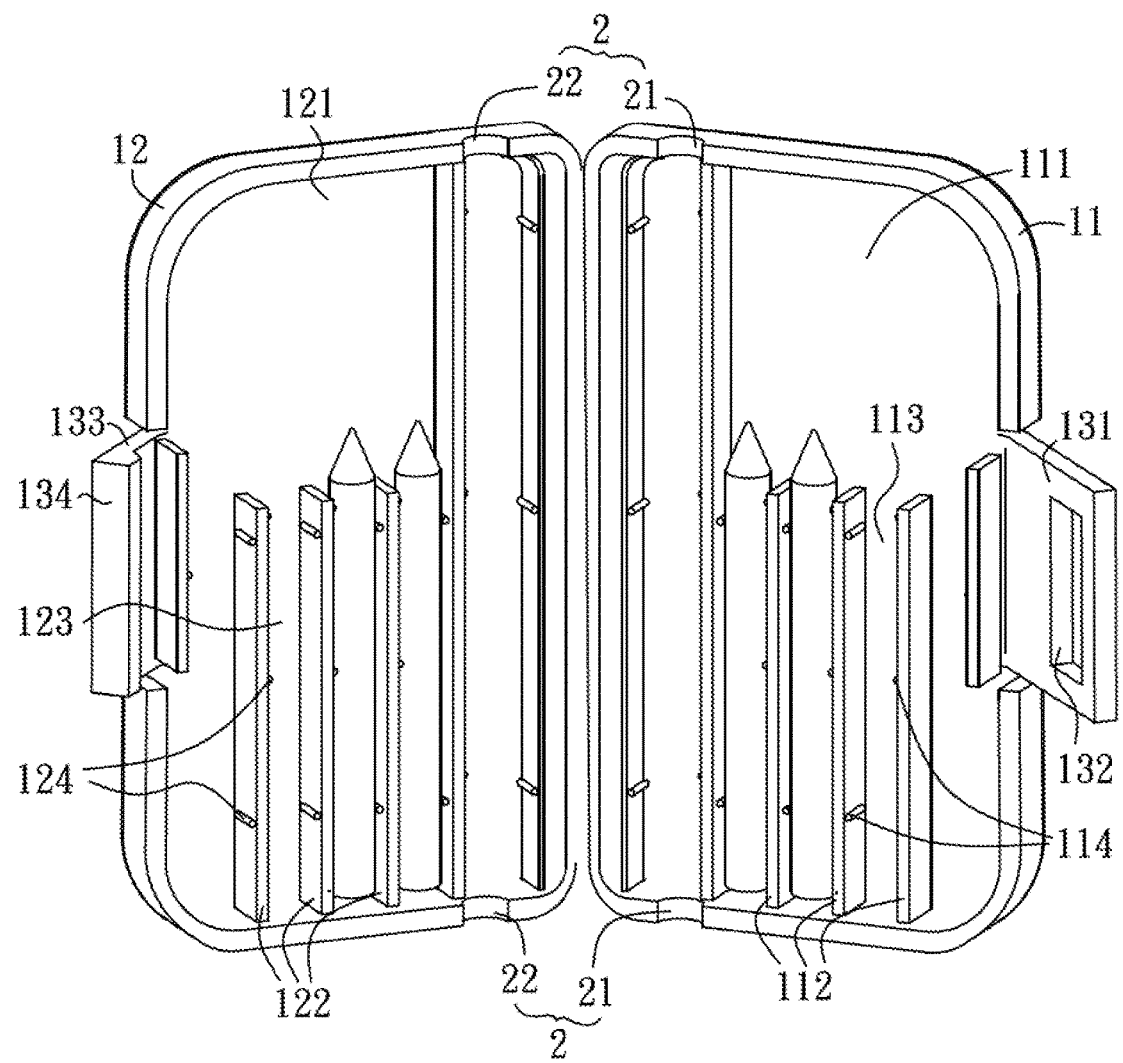
FIG. 1E is a drawing in top view of the core disassembling device when the core disassembling device is opened.

Please refer to FIG. 1A to FIG. 1E simultaneously, FIG. 1A to FIG. 1D are drawings in front view, in left view, in right view, and in back view of a core disassembling device in accordance with one embodiment of the present invention, and FIG. 1E is a drawing in top view of the core disassembling device when the core disassembling device is opened. The core disassembling device comprises an opening-closing box housing 1 and at least one holding hole (there are two holding holes 2 in this embodiment). The opening-closing box housing 1 comprises an upper housing 11 and a bottom housing 12. The upper housing 11 is corresponded to the bottom housing 12. One side of the upper housing 11 is connected with one side of the bottom housing 12 for forming a box (the opening-closing box housing 1) which can be opened and closed. The box (the opening-closing box housing 1) can be opened from another side of the upper housing 11 and another side of the bottom housing 12 because the two sides are not connected with each other. By this connection, the upper housing 11 and the bottom housing 12 are not separated from each other when box (the opening-closing box housing 1) is opened. The holding hole 2 is deposited at one side of the opening-closing box housing 1. In this embodiment of the present invention, the core disassembling device has two holding holes 2 and the two holding holes 2 are deposited at the left side and the right side of the opening-closing box housing 1 respectively, and the two holding holes 2 are corresponded to each other. However, it is not a limit. In other embodiment of the present invention, the number of the holding holes 2 can be decreased (such as only one holding hole) or increased (such as three, four, or more holding holes) according to requirement and design. Although the holding holes 2 are deposited at two sides of the opening-closing box housing 1 respectively and symmetrically in this embodiment, but it is not a limit. In other embodiments of the present invention, the holding holes may be unsymmetrically deposited at the left side and the right side of the opening-closing box housing, deposited at the same side of the opening-closing box housing, deposited at two different sides (such as the left side and the right side, the front sider and the left side, or the front sider and the right side), or deposited at three different sides (such as the left side, the right side, and the front sider) in other embodiments of the present invention. The opening-closing box housing 1 (including the upper housing 11 and the bottom housing 12) is made of an elastic material (such as a plastic material).

Each of the holding holes 2 is a circular guiding hole deposited at one side of the opening-closing box housing 1. Each of the holding holes 2 is comprised of a semi-circular first notch 21 and a semi-circular second notch 22. The first notch 21 is a semi-circular guiding slot deposited at one side of the upper housing 11. In this embodiment, the two first notches 21 are symmetrically deposited at the left side and the right side of the upper housing 11, but it is not a limit. In other embodiments of the present invention, the locations of the first notches may be modified according to above-mentioned design of the holding holes. The second notch 22 is a semi-circular guiding slot deposited at one side of the bottom housing 12. In this embodiment, the two second notches 22 are symmetrically deposited at the left side and the right side of the bottom housing 12, but it is not a limit. In other embodiments of the present invention, the locations of the second notches may be modified according to above-mentioned design of the holding holes. When the opening-closing box housing 1 is closed (the upper housing 11 is closed by the bottom housing 12), the first notch 21 is opposite to the second notch 22 and they are combined with each other to form a circular guiding hole (the holding hole 2). The diameter of the circular guiding hole (the holding hole 2) is smaller than the diameter of the core of the capacitance pen. Therefore, after the core of the capacitance pen is put into the first notch 21 or the second notch 22 along the stretching direction of the first notch 21 or the second notch 22 and the user closes the opening-closing box housing 1, the circular guiding hole (the holding hole 2) can hold and fix the core of the capacitance pen therein tightly. It is because the diameter of the circular guiding hole (the holding hole 2) is smaller than the diameter of the core and the opening-closing box housing 1 (including the upper housing 11 and the bottom housing 12) is made of an elastic material (such as a plastic material). It means that it is not easy to draw the core out from the holding hole 2 because of the smaller diameter of the holding hole 2 and the elasticity of the opening-closing box housing 1. It is helpful for the user to draw the core out the housing of the capacitance pen. Therefore, the user can use the holding hole instead of the user's fingers to hold the core of the capacitance pen and force to the opening-closing box housing 1 instead of the core of the capacitance pen for holding and fixing the core of the capacitance pen. By this way, a good posture of application of force to pinch or hold the core of the capacitance pen is provided. By the posture, the user can draw the core out the capacitance pen and change the core with less force or effort. Therefore, it is easy and convenient for the user to draw the core out the capacitance pen and change a new core.

Furthermore, the core disassembling device of the present invention also can be used as a storage box for storing the cores of the capacitance pens. The upper housing 11 comprises a first receiving space 111 therein. The first receiving space 111 comprises at least two raised strips 112, and the two raised strips 112 are parallel with each other for forming a receiving slot 113 between the two raised strips 112 to receive a core 3. Each of the raised strips 112 comprises at least one fixing bump 114 for holding the core 3 in the receiving slot 113 tightly. In this embodiment, there are three raised strips 112 in the first receiving space 111 and they are parallel with each other. There are four receiving slots 113 formed by three raised strips 112 and the two side walls of the first receiving space 111 (or the upper housing 11), and each of the three raised strips 112 has one or two fixing bumps 114 unsymmetrically deposited at the two sides of the raised strip 112. However, it is not a limit. The number of the raised strip and the number and the location of the fixing bump in the upper housing can be changed according to requirement and design. There are many variations and modifications of the raised strip and the fixing bump, but all of these variations and modifications are designed for a purpose of storing and holding the cores in the receiving slots. According to disclosure of the present invention, it is easy for a person having ordinary skill in the art to vary or modify the design of the raised strip and the fixing bump. Therefore, it is appreciated by those skilled in the art that various modifications of the raised strip and the fixing bump are made without departing from the scope of the present invention. The bottom housing 12 comprises a second receiving space 121 therein. The second receiving space 121 comprises at least two raised strips 122, and the two raised strips 122 are parallel with each other for forming a receiving slot 123 between the two raised strips 122 to receive a core 3. Each of the raised strips 122 comprises at least one fixing bump 124 for holding the core 3 in the receiving slot 123 tightly. In this embodiment, there are three raised strips 122 in the second receiving space 121 and they are parallel with each other. There are four receiving slots 123 formed by three raised strips 122 and the two side walls of the second receiving space 121 (or the bottom housing 12), and each of the three raised strips 122 has one or two fixing bumps 124 unsymmetrically deposited at the two sides of the raised strip 122. However, it is not a limit. The number of the raised strip and the number and the location of the fixing bump in the bottom housing can be changed according to requirement and design. There are many variations and modifications of the raised strip and the fixing bump, but all of these variations and modifications are designed for a purpose of storing and holding the cores in the receiving slots. According to disclosure of the present invention, it is easy for a person having ordinary skill in the art to vary or modify the design of the raised strip and the fixing bump. Therefore, it is appreciated by those skilled in the art that various modifications of the raised strip and the fixing bump are made without departing from the scope of the present invention.

Besides, the core disassembling device of the present invention further comprises a fastener 13 for keeping the opening-closing box housing 1 in a closed form. The fastener 13 comprises a protrusion 133 and a holder 131 having a receiving hole 133. The protrusion 133 and the holder 131 (including the receiving hole 133) are male member and female member of the fastener 13 respectively. When the protrusion 133 is inserted into the receiving hole 132 of the holder 131, the opening-closing box housing 1 is kept in a closed form. The holder 131 and the protrusion 133 are respectively deposited at the front side of the upper housing 11 and the front side of the bottom housing 12. In this embodiment, the holder 131 is a plate extending from the front side of the upper housing 11 and the plate can be bent. The protrusion 133 is a block extending from the front side of the bottom housing 12. However, it is not a limit. In other embodiment of the present invention, the holder 131 may be deposited at the front side of the bottom housing 12 and the protrusion 133 may be deposited at the front side of the upper housing 11. Besides, the protrusion 133 has a coupler 134 extending upward or downward from the front side of the protrusion 133. When the protrusion 133 is inserted into the receiving hole 132 of the holder 131, the coupler 134 hooks the holder 131 for fixing the protrusion 133 and the holder 131 together. Therefore, it is not easy to separate the protrusion 133 from the holder 131.

Figure 2A:
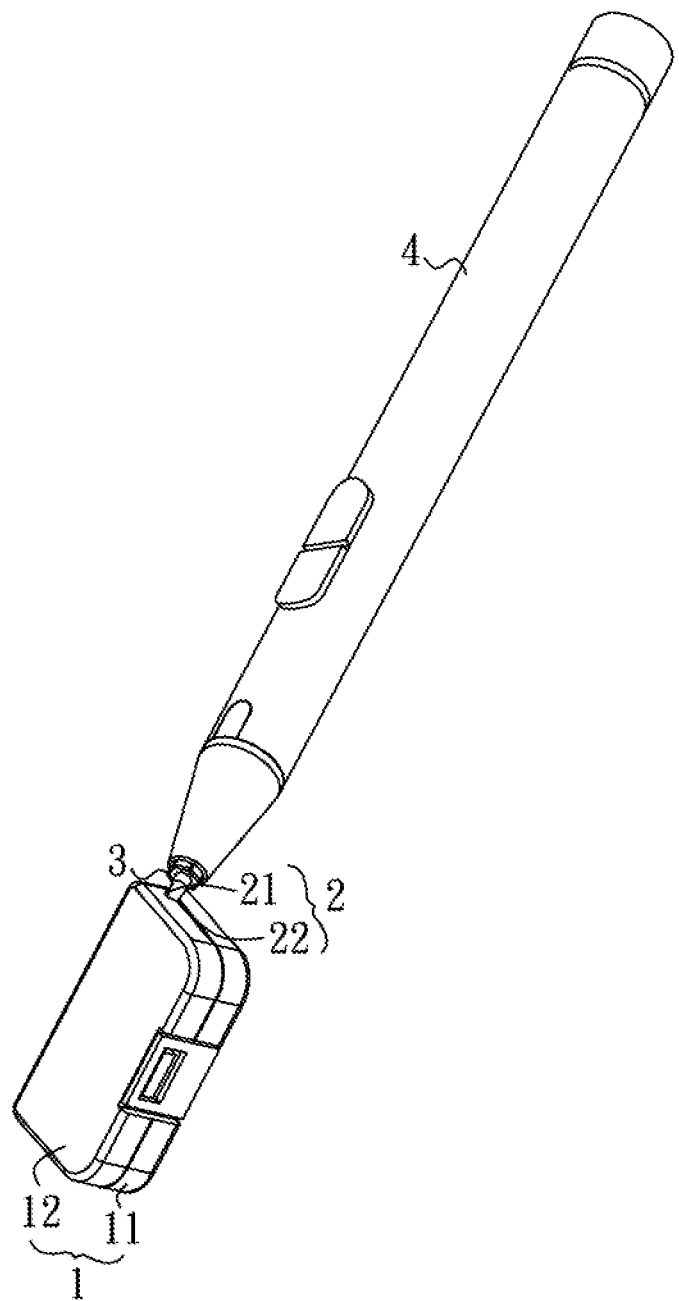
FIG. 2A is a drawing illustrating the core disassembling device in accordance with one embodiment of the present invention when a core of a capacitance pen is put into the core disassembling device.
Figure 2B:
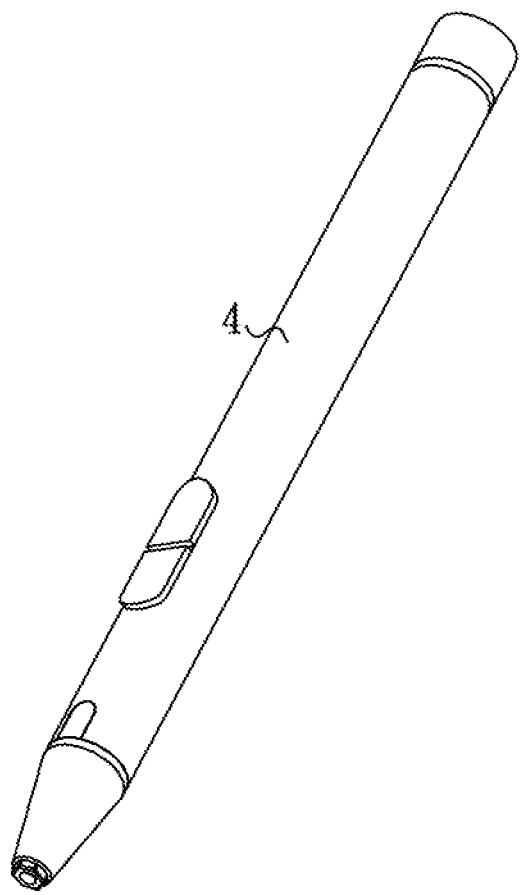
FIG. 2B is a drawing illustrating the core disassembling device in accordance with one embodiment of the present invention when the core of the capacitance pen is drawn out capacitance pen.
Figure 2B:
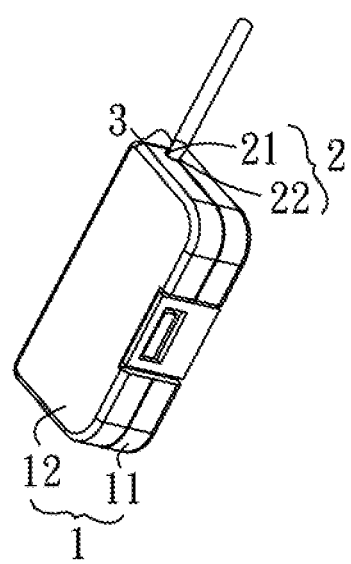

Next, we will show how to use the core disassembling device of the present invention to draw the core out the capacitance pen and change it. First, referring to FIG. 2A, it is a drawing illustrating the core disassembling device in accordance with one embodiment of the present invention when a core of a capacitance pen is put into the core disassembling device. The opening-closing box housing 1 is opened first, and then, the core 3 of the capacitance pen 4 is put into the first notch or the second notch (or the semicircular guiding slot) along the stretching direction of the first notch or the second notch. After, the opening-closing box housing 1 is closed for holding and fixing the core 3 in the holding hole 2. The holding hole 2 can hold the core 3 therein tightly because the diameter of the holding hole 2 (or the circular guiding hole) formed by the first notch and the second notch is smaller than the diameter of the core 3 and the opening-closing box housing 1 is made of an elastic material. Therefore, the core 3 can not be drawn out from the holding hole 2. Next, referring to FIG. 2B, it is a drawing illustrating the core disassembling device in accordance with one embodiment of the present invention when the core of the capacitance pen is drawn out capacitance pen. After the core 3 is held in the holding hole 2, the user holds the capacitance pen 4 with one hand and holds the core disassembling device (or the opening-closing box housing 1) with the other hand. The user retains the hand holding the capacitance pen 4 immovable (means does not move), but the hand holding the core disassembling device (or the opening-closing box housing 1) forces the core disassembling device (or the opening-closing box housing 1) to move the core disassembling device (or the opening-closing box housing 1) toward the direction away from the capacitance pen 4. Therefore, the user can draw the core 3 out capacitance pen 4 with a good posture of application of force to hold and draw the core, and by the posture, the user can draw the core 3 out capacitance pen 4 without pains of the user's hands. Or, the user may retain the hand holding the core disassembling device (or the opening-closing box housing 1) immovable (means does not move), but the hand holding the capacitance pen 4 forces the capacitance pen 4 to move the capacitance pen 4 to move the capacitance pen 4 toward the direction away from the core disassembling device (or the opening-closing box housing 1). By this way, the user also can draw the core 3 out capacitance pen 4 with a good posture of application of force to hold and draw the core, and by the posture, it is easy and convenient for the user to draw the core 3 out capacitance pen 4. Therefore, the user can draw the core 3 out capacitance pen 4 without pains of the user's hands caused by the bad forcing pose and much force.

According to foregoing embodiments, the present invention provides a core disassembling device. The user can use the holding hole of the core disassembling device in place of the user's fingers to hold the core of the capacitance pen. When the user changes the core, the user can perform a force on the opening-closing box housing of the core disassembling device in place of the core. Therefore, the user can have a good posture of application of force to hold and draw the core. By this posture, the force (or effort) for drawing and changing the core can be decreased and it is easy and convenient for the user to change the core of the capacitance pen.

What is claimed is:

1. A core disassembling device and a capacitance pen, the capacitance pen comprising a core to transmit capacitance signals, the core disassembling device comprising:
    an opening-closing box housing having an upper housing and a bottom housing, one side of the upper housing is connected with one side of the bottom housing to permit opening and closing of the opening-closing box housing, a side wall of the upper housing having a first notch, a side wall of the bottom housing having a second notch;
    wherein the opening-closing box housing is made of an elastic material; the core of the capacitance pen is placed in the first notch or the second notch when the opening-closing box is opened; the first notch and the second notch constitute a circle-shaped holding hole when the opening-closing box is closed; and a diameter of the circle-shaped holding hole is smaller than a diameter of the core of the capacitance pen, so that the core is pinched by the opening-closing box and can be drawn out from the capacitance pen via the opening-closing box after the opening-closing box is closed.

2. The core disassembling device and the capacitance pen of claim 1, wherein the core disassembling device comprises a fastener for keeping the opening-closing box housing in a closed form.

3. The core disassembling device and the capacitance pen of claim 2, wherein the fastener comprises a protrusion and a holder having a receiving hole, and the opening-closing box housing is kept in a closed form when the protrusion is inserted into the receiving hole.

4. The core disassembling device and the capacitance pen of claim 1, wherein the upper housing comprises a first receiving space therein, the first receiving space comprises at least two raised strips, and the two raised strips are parallel with each other for forming a receiving slot to receive a core.

5. The core disassembling device and the capacitance pen of claim 4, wherein each of the raised strips comprises at least one fixing bump for holding the core in the receiving slot.

6. The core disassembling device and the capacitance pen of claim 1, wherein the bottom housing comprises a second receiving space therein, the second receiving space comprises at least two raised strips, and the two raised strips are parallel with each other for forming a receiving slot to receive a core.

7. The core disassembling device and the capacitance pen of claim 6, wherein each of the raised strips comprises at least one fixing bump for holding the core in the receiving slot.

8. The core disassembling device and the capacitance pen of claim 1, wherein the elastic material is a plastic material.

* * * * *